(12) United States Patent
Aubarede et al.

(10) Patent No.: US 6,470,554 B1
(45) Date of Patent: Oct. 29, 2002

(54) METHOD AND DEVICE FOR ACCURATE MOUNTING OF A MACPHERSON STRUT SUSPENSION CONTROL ROD

(75) Inventors: Francis Aubarede, Pontgibaud (FR); Antoine Ducloux, La-Roche-Blanche (FR)

(73) Assignee: Compagnie Generale des Establissements Michelin-Michelin & Cie (FR)

( * ) Notice: Subject to any disclaimer, the term of this patent is extended or adjusted under 35 U.S.C. 154(b) by 0 days.

(21) Appl. No.: 09/700,318

(22) PCT Filed: Feb. 9, 2000

(86) PCT No.: PCT/FR00/00303

§ 371 (c)(1),
(2), (4) Date: Feb. 20, 2001

(87) PCT Pub. No.: WO00/56504

PCT Pub. Date: Sep. 28, 2000

(30) Foreign Application Priority Data

Mar. 19, 1999 (FR) .............................................. 99 03427

(51) Int. Cl.⁷ ................................................ B23P 11/02
(52) U.S. Cl. ............................ 29/450; 29/225; 29/227
(58) Field of Search .......................... 29/225, 227, 450

(56) References Cited

U.S. PATENT DOCUMENTS

| 2,301,742 | A | * | 11/1942 | Müller | |
| 2,405,458 | A | * | 8/1946 | Slack | |
| 2,646,618 | A | | 7/1953 | Simons | |
| 2,652,625 | A | * | 9/1953 | Perkins | ......................... 29/227 |
| 3,067,500 | A | * | 12/1962 | Bliss | ........................... 29/227 |
| 3,128,542 | A | * | 4/1964 | Strawn | ........................ 29/227 |
| 4,009,867 | A | | 3/1977 | Diffenderfer | |
| 4,690,425 | A | * | 9/1987 | Kubo | |
| 4,703,547 | A | | 11/1987 | Togawa | |
| 4,732,365 | A | | 3/1988 | Kloster | |
| 4,785,519 | A | | 11/1988 | Krueger | |
| 5,680,686 | A | | 10/1997 | Bolgrean et al. | |
| 5,791,033 | A | * | 8/1998 | Norby et al. | ................. 29/225 |

FOREIGN PATENT DOCUMENTS

DE 29815481 12/1998

OTHER PUBLICATIONS

Patent Abstracts of Japan, vol. 006, No. 058 (M–122), Apr. 15, 1982 & Japanese Publication No. 57001630 published Jan. 6, 1982 in the name of Toyota Motor Corp.

* cited by examiner

Primary Examiner—S. Thomas Hughes
Assistant Examiner—Steven Blount
(74) Attorney, Agent, or Firm—Baker Botts L.L.P.

(57) ABSTRACT

The invention concerns a method and a device for mounting a MacPherson strut suspension radius rod, comprising steps which consist in: inserting the elements forming the control rod beneath a mounting head having at least a tilting degree of liberty; bringing the control rod top end alongside a portion of the mounting head; compressing the spring by the relative movement of the mounting head with respect a locking member engaged in its prestressed spring, when the mounting head portion comes to a stop and when the shock-absorber rod moves beyond the upper spring retainer.

9 Claims, 5 Drawing Sheets

Figure 1:
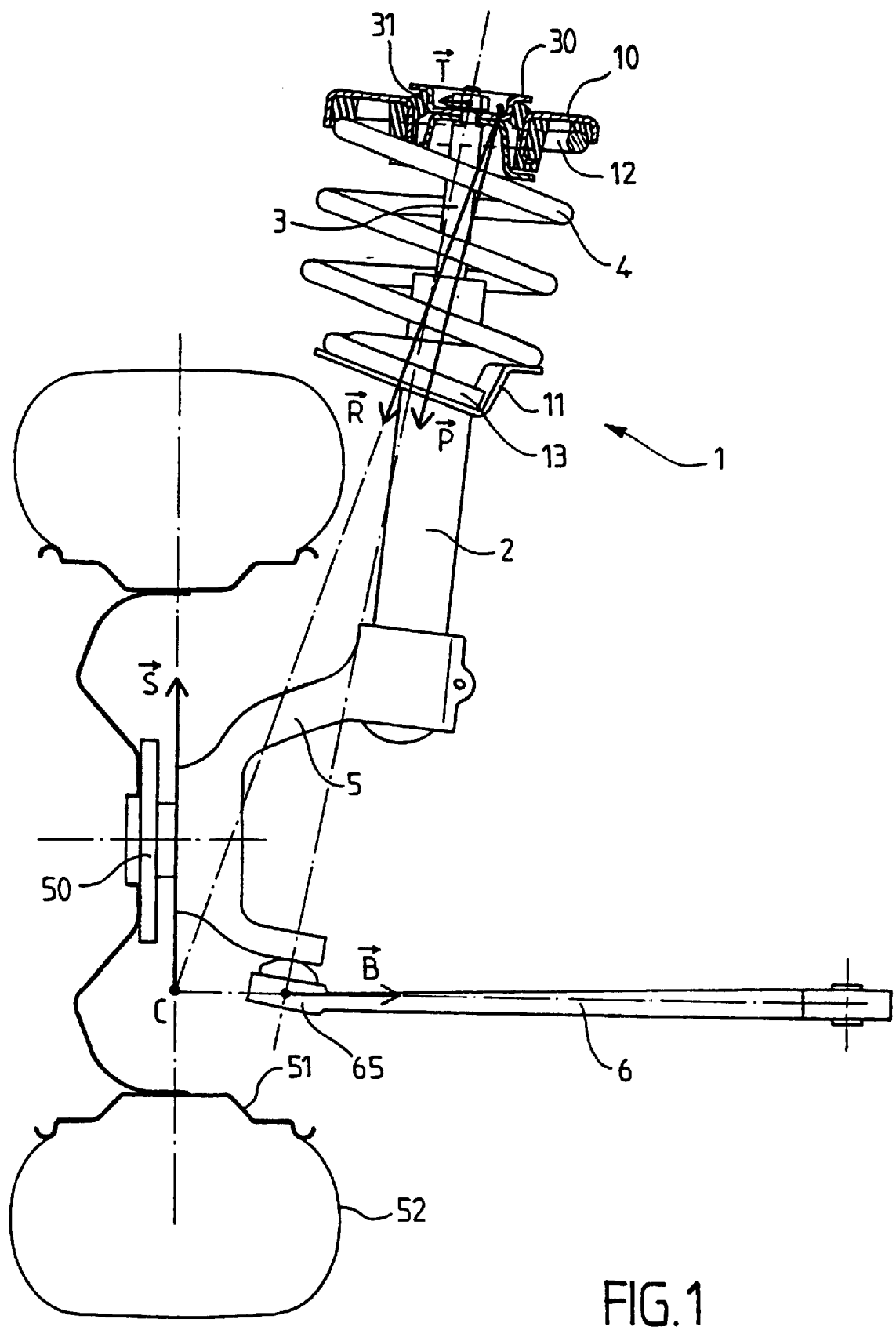

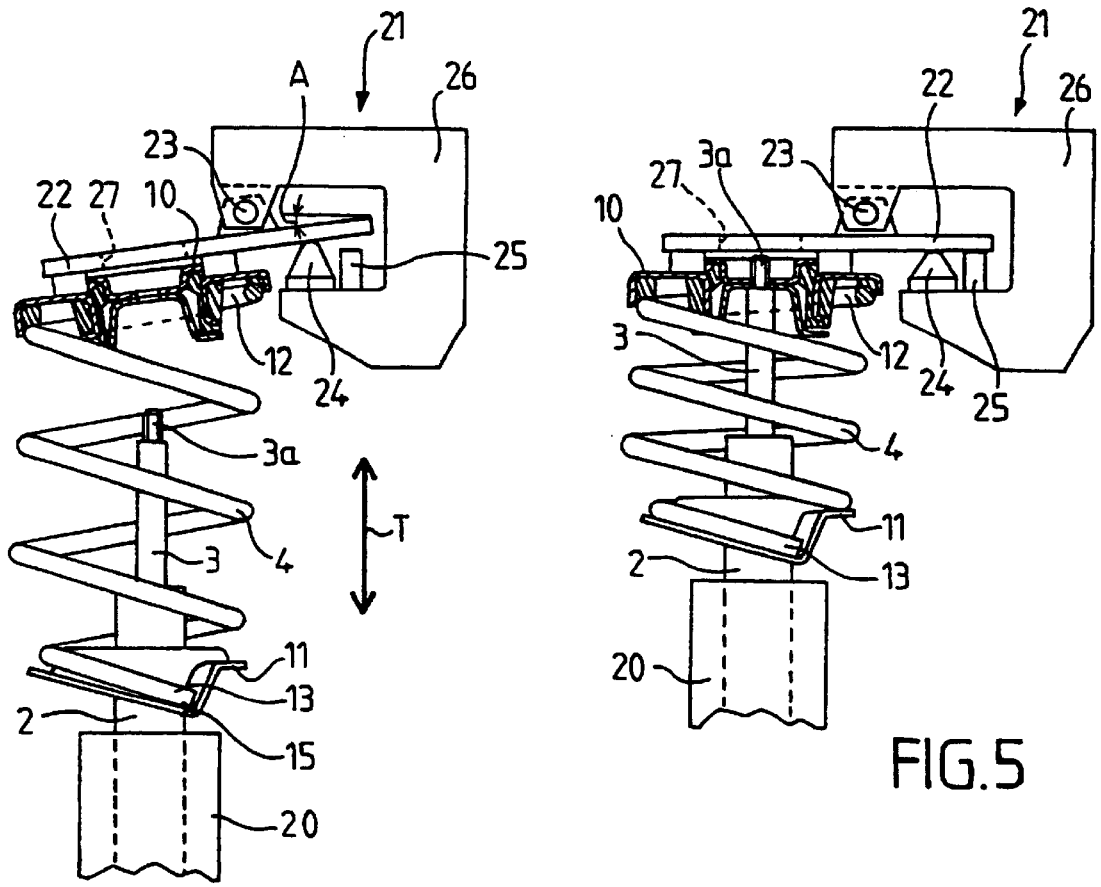
FIG.4
FIG.5
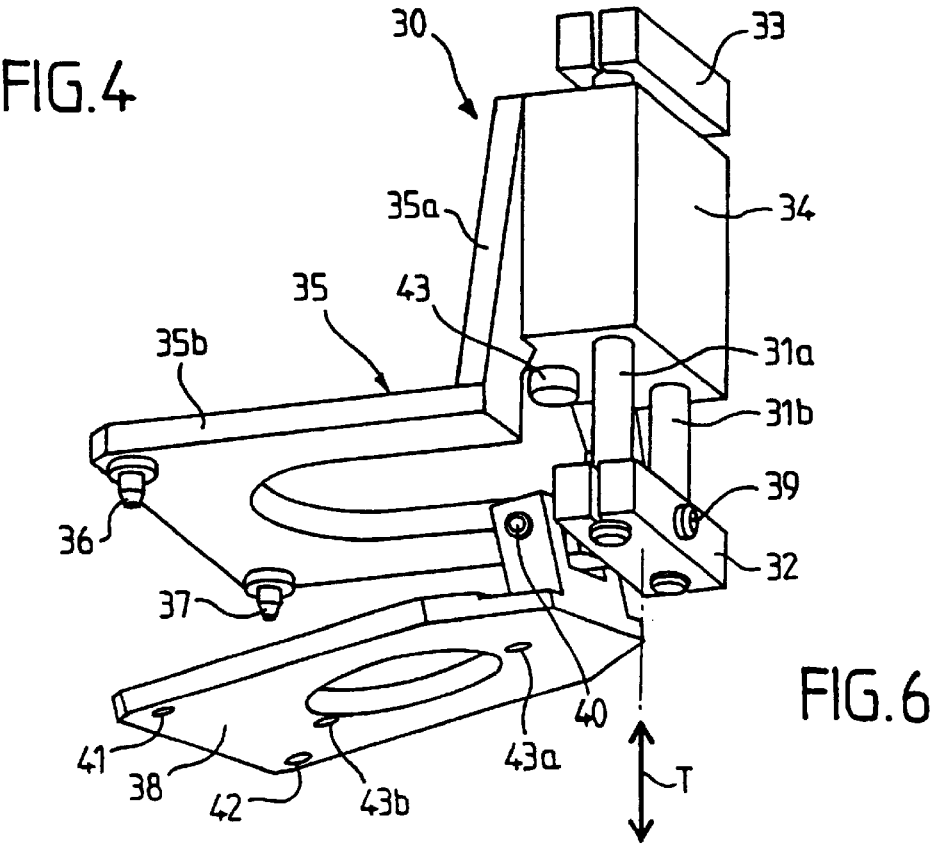
FIG.6

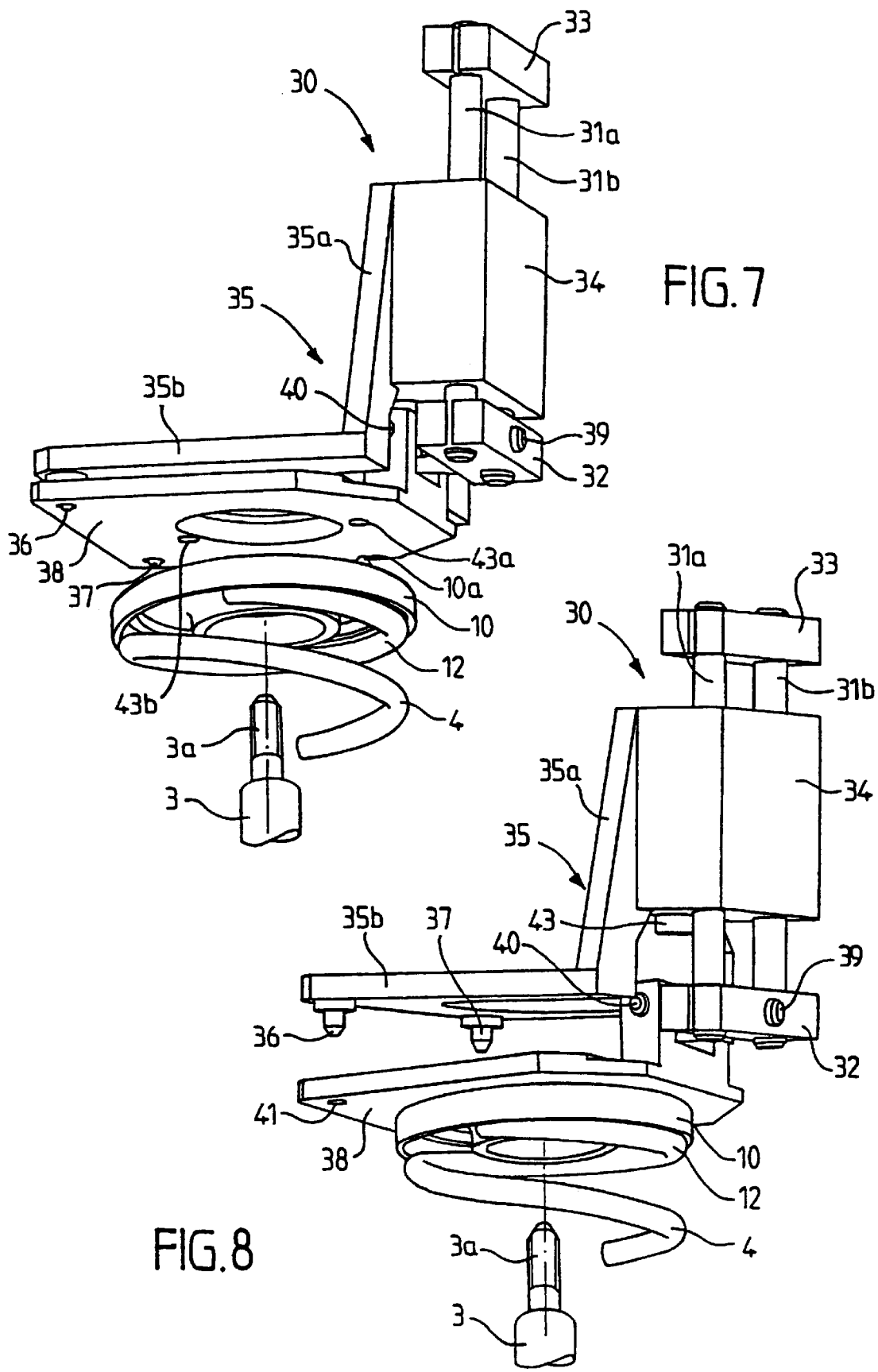

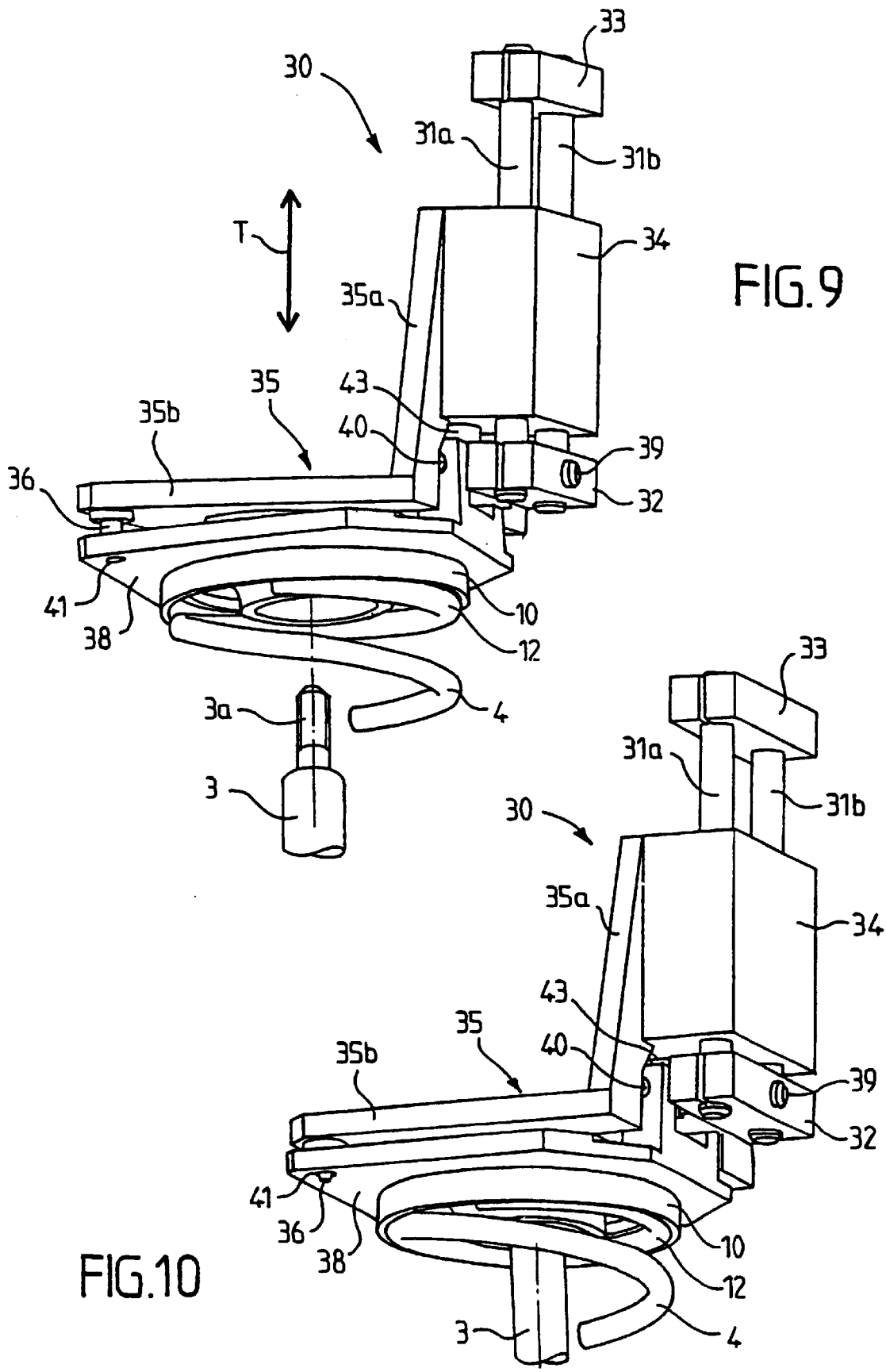

METHOD AND DEVICE FOR ACCURATE MOUNTING OF A MACPHERSON STRUT SUSPENSION CONTROL ROD

This application is a national phase application under 35 U.S.C. 371 of international application serial number PCT/FR00/00303 filed Feb. 9, 2000 and published as WO 00/56504 on Sept. 28, 2002 in French, which claims priority to French application serial number FR 99/03,427 filed Mar. 19, 1999.

The invention relates to a method for the precise mounting of a MacPherson suspension strut.

The invention also relates to a device for the precise mounting of a MacPherson suspension strut making it possible, in particular, to implement the steps of the method according to the invention.

Document EP- 0 780 250 A2 describes the precise adjustment of a MacPherson suspension strut, using adjusting means on the strut and advantageously measuring the mechanical properties of the strut using an appropriate measurement bench.

A MacPherson suspension strut comprises a compressively preloaded coil spring.

Whereas contact is over at least three sectors when the spring is in the compressed state, the spring in the unconstrained state before compression is generally in contact with each upper or lower spring retainer at just one point.

This limited point contact is detrimental to the precision with which MacPherson suspension struts can be mounted.

In current mounting machines, attempts are made at improving the precision of the mounting by centering the spring by providing secondary contact on the outside of the turns, by precompressing the spring before it is mounted on the strut, or by using equivalent means.

However, the current solutions are not satisfactory and lead to imprecise spring centering, because this centering is sensitive to the spread on the mechanical properties of the springs.

The object of the invention is to overcome the drawbacks of the prior art by proposing a new technique for the precise mounting of MacPherson suspension struts, which is insensitive to the mechanical and geometric variations of the springs, and which is economical and easy to implement.

The subject of the invention is a method for mounting a MacPherson suspension strut, comprising the following steps:

a) introducing the constituent elements; of the strut under a mounting head which has at least one degree of freedom in tilting;

b) mating the upper end of the strut with a part of the mounting head;

c) compressing the spring by shifting the mounting head relative to an immobilizing means engaged with the body of the shock absorber;

d) mounting the strut with its preloaded spring when said part of the mounting head comes into abutment and when the shock absorber rod protrudes through the upper spring retainer.

According to other features of the invention:

the part of the mounting head has two degrees of freedom in tilting;

the part of the mounting head is mounted on the body of the mounting head by a universal joint;

the part of the mounting head is guided in sliding relative to the body of the mounting head.

Another subject of the invention is a device for the precise mounting of a MacPherson suspension strut, comprising a means of immobilizing a shock absorber connected to a mounting head which can be shifted one with respect to the other, characterized in that the mounting head has a part with at least a degree of freedom in tilting and capable of mating with an upper spring retainer of a strut, so as to allow the spring to be compressed without introducing parasitic loadings.

According to other features of the invention:

the device comprises at least one limit stop for stopping said part in a chosen predetermined orientation;

said part is mounted on the body of the mounting head via a universal joint;

said part is shaped as a plate to take an upper spring retainer with a central passage;

the mounting head has a second part of predetermined orientation capable of limiting the tilting movement of said part while the spring is being compressed;

the second part is shaped as a stop plate carrying at least one limit stop position stop.

Figure 2:
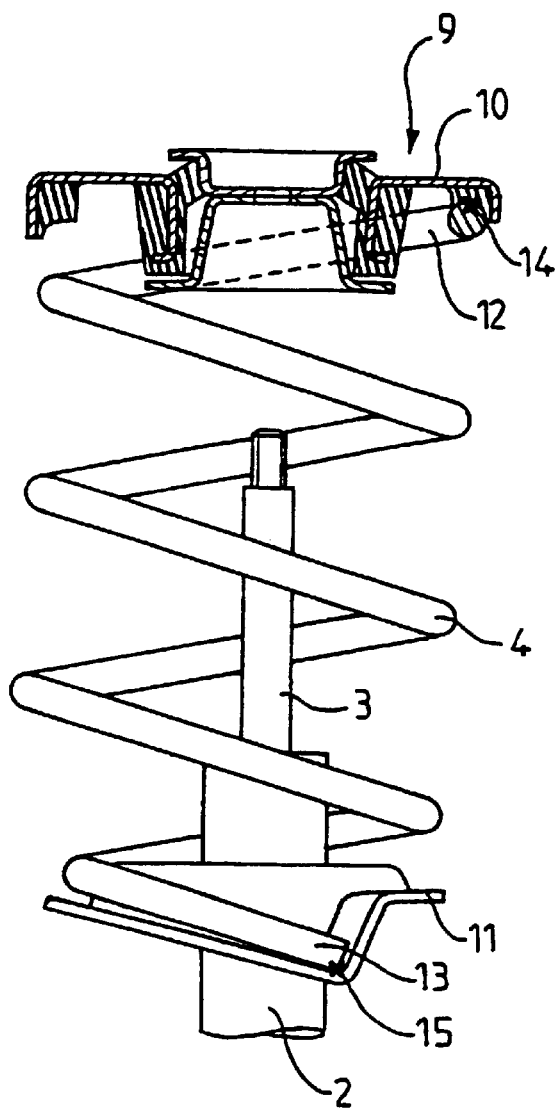
Figure 3:
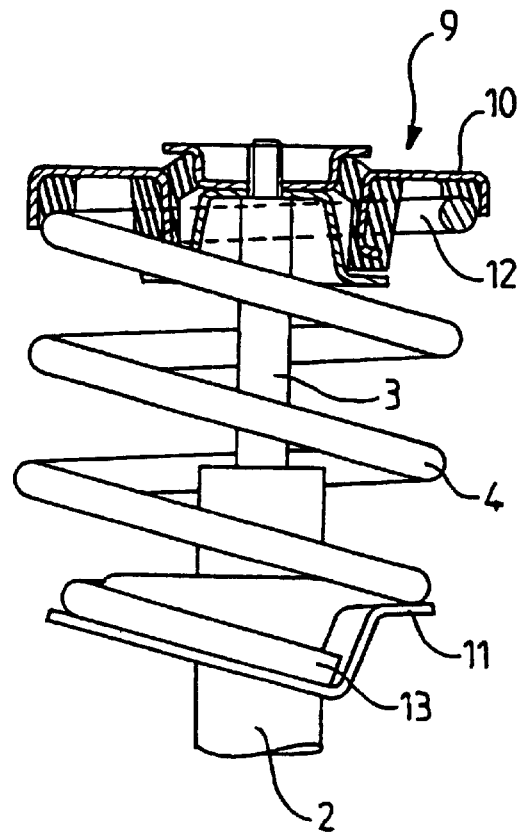

The invention will be better understood by virtue of the description which will follow, given by way of nonlimiting example with reference to the appended drawings, in which:

FIG. 1 diagrammatically depicts a view in elevation with part section through the wheel of a MacPherson suspension;

FIGS. 2 and 3 diagrammatically depict a part view in elevation with part section through the upper spring retainer of a MacPherson suspension strut, in the unconfined state and in the compressed state, respectively;

FIGS. 4 and 5 diagrammatically depict a part view with part section of the upper spring retainer of a first embodiment of a device for the precise mounting of MacPherson suspension struts;

FIG. 6 diagrammatically depicts a perspective view of an assembly head of a second embodiment of the device for the precise mounting of a MacPherson suspension strut;

FIGS. 7 to 10 diagrammatically depict the implementation of the invention using a second embodiment of a device for the precise mounting of MacPherson suspension struts;

FIG. 1 describes a MacPherson suspension similar to the suspension described in FIG. 1 of document EP-0 780 250 A2.

With reference to FIG. 1, a MacPherson suspension strut comprises a shock absorber which plays a part in guiding the wheel and a spring which carries the body of the vehicle and gives the suspension the required rigidity.

The shock absorber comprises a body 2 and a rod 3. The upper end 30 of the rod 3 bears against the body of the vehicle at a point of articulation 31 generally embodied by an elastic articulation. A coil spring 4 is mounted between an upper spring retainer 10 and a lower spring retainer 11. The lower spring retainer 11 bears against the body 2 of the shock absorber and the upper spring retainer 10 bears against the body of the vehicle, generally also via filtering performed by said elastic articulation and which filtering may, in certain embodiments, be the same for the spring and the shock absorber.

The body 2 of the shock absorber is secured to a hub carrier 5 so as to eliminate any degree of freedom between the body 2 and the hub carrier 5. A lower arm 6 is articulated at one end to the body of the vehicle and at the other end to the hub carrier 5 by an articulation 65. The hub carrier 5 carries the hub 50 on which a wheel 51 equipped with its tyre 52 is mounted.

Each upper spring retainer 10 or lower spring retainer 11 has a bearing surface for taking and centering a corresponding end turn, 12 or 13 respectively, of the spring 4. Each bearing surface has a shape determined so that it will be in contact over a great length with the corresponding end turn 12 or 13 of the spring 4 when this spring 4 is compressed under the effect of the weight of the vehicle. Advantageously, each bearing surface has a rather helicoidal shape, continuous or discontinuous, preferably with at least three sectors of contact with the corresponding end turn 12 or 13 of the spring 4.

The end turns 12 and 13 of the spring 4 have a rather helicoidal shape, the helix angle of which varies as the spring 4 is compressed, whereas the helicoidal shapes of the bearing surfaces on the spring retainers 10 and 11 remain unchanged as the spring is compressed.

With reference to FIGS. 2 and 3, a MacPherson suspension strut comprises a shock absorber with a body 2 and a rod 3, a spring 4, an upper end 9 and a lower spring retainer 11 for respectively taking an end turn 12 and an end turn 13 of the spring 4.

In the examples that illustrate the invention, the upper end 9 is essentially formed by the upper spring retainer 10, acting as a bearing surface for the spring. This arrangement is of course nonlimiting, the invention also in particular covering the instance in which a rolling bearing is inserted between the upper end 9 and the upper spring retainer 10, in contact with the spring 4.

In the relaxed position of FIG. 2, the pitch of the turns of the coil spring 4, and the helix angle of these turns, is greater than in the compressed position of FIG. 3.

In FIG. 2, the helix angles of the end turns 12 and 13 of the spring 4 are therefore greater than the corresponding helix angles of the upper spring retainer 10 and lower spring retainer 1. Because of this difference in angle, the turns 12 and 13 are in contact with the spring retainers 10 and 11 only as point contacts at 14 and 15.

By contrast, in the compressed position of FIG. 3 which corresponds to the spring 4 being mounted preloaded, the pitches and helix angles of the end turns 12 and 13 correspond respectively to the helicoidal pitches and helix angles of the spring retainers 10 and 11, which means that contact is over a bearing surface. In general, this surface contact is over at least three bearing sectors spread out around each spring retainer 10 or 11.

The object of the invention is therefore to obtain precise mounting of the suspension strut, passing from the relaxed position of FIG. 2 into the compressed position of FIG. 3 while optimizing the characteristics of the suspension in accordance with the conditions of document EP-0 780 250 A2.

With reference to FIGS. 4 and 5, a MacPherson suspension strut comprising a shock absorber with a body 2 and a rod 3, a coil spring 4 with two end turns 12 and 13 and two spring retainers, upper 10 and lower 11, is mounted in a first embodiment of a device according to the invention.

The device according to the invention comprises a stand, not depicted, or a securing structure connecting to a mounting head 21 an external clamping device 20 of the chuck type, so as to hold the shock absorber body 2 in a fixed position.

The mounting head 21 and the-external clamping member 20 are mounted in the stand, not depicted, in relative translation in the direction of the arrow T: thus, to pass from the position of FIG. 4 to the position of FIG. 5 all that is therefore required is for the member 20 to be displaced in translation in the direction of the arrow T relative to the mounting head 21.

In FIG. 4, the spring 4 in the unconfined state, is in surface bearing via its upper end turn 12 on the upper spring retainer 10. The upper spring retainer 10 is mounted on a plate 22 with freedom to move along at least one axis with respect to the mounting head 21; this freedom to move allows the upper spring retainer 10 to be oriented and placed on the upper end turn 12 of the spring 4.

In the unconfined position, the plate 22 and the upper spring retainer 10 make an angle A with the plane perpendicular to the axis of the shock absorber. The lower end turn 13 of the spring 4 rests on the lower spring retainer 11 at one point 15 at least.

To give the plate 22 carrying the upper spring retainer 16 freedom to tilt, a rotating articulation about at least one axle 23 transverse to the shock absorber axis is provided. The support plate 22 is therefore mounted so that it floats or oscillates about the axle 23 secured to the mounting head 21.

By performing a closing-together movement in the direction T, the spring 4 is compressed during the closing-together movement and exerts a compressive force on an elastic damping stop 24 until it comes into compression on a fixed stop 25 limiting the pivoting movement of the plate 22.

As a preference, the mounting head 21 has a body 26 advantageously in the form of a yoke which, on one side, carries the pivot axle 23 for the plate 22 and on another side carries the elastic damping stop 24 and the limit stop 25.

In FIG. 5, when the plate 22 totally compresses the elastic stop 24 and has been stopped by the limit stop 25, the position of the plate 22 corresponds to a predetermined position in which the upper spring retainer 10 is-centered in a predetermined way with respect to the axis of the shock absorber. In this predetermined position, the threaded end 3a of the shock absorber rod passes through the central orifice in the upper spring retainer 10 so as to allow the suspension strut to be mounted preloaded by screwing an end nut onto the threaded end 3a of the shock absorber rod 3.

Thus, having appropriately oriented the upper spring retainer 10 with respect to the lower spring retainer 11 and with respect to the shock absorber, the MacPherson strut can automatically be mounted in the precise desired way.

To allow this screwing operation, provision is advantageously made for the plate 22 to have a central passage 27 allowing an end nut to be screwed on. This central passage 27 also allows the mounting to be inspected visually.

With reference to FIG. 6, a second embodiment of a device according to the invention comprises elements similar to those of FIGS. 4 and 5 and can be distinguished from the first embodiment in that it has an improved mounting head.

The mounting head 30 in this second embodiment is mounted on two guide bars 31a, 31b braced apart by appropriate clamping members 32, 33. The clamping blocks 32, 33 thus provide immobile rigid support that can move in relative motion with respect to a bottom chuck that holds the shock absorber, not depicted.

A body 34 carries a bracket 35, one of the sides 35a of which is fixed to the body 34 and the other side 35b of which constitutes a plate in a predetermined direction. The plate 35b carries two frustoconical pegs 36, 37 forming positioning stops.

A floating plate 38 is mounted so that it can pivot freely on a universal joint about two axles 39 and 40, for example on the clamping member 32 or on any other element secured to the stand of the device.

The plate 38 therefore is able to take an upper spring retainer for the strut and to adopt any relative position, without the need for prior adjustment or orientation.

The dimensions of the mounting head 30 are determined so that in the position of maximum compression, the plate 38 is in a predetermined position in which orifices 41 and 42 are positioned and centered by frustoconical stubs 36 and 37 of the stop plate 35b.

The mounting head 30 therefore has the possibility of relative movement in translation T with respect to the chuck, not depicted, that secures the shock absorber, and also freedom to move about the axles 39 and 40 positioned in a universal joint layout.

A positioning stop 43 is advantageously provided to limit the relative translational movement of the plate 38 and make sure that it is parallel to the plate 35b: this positioning is very accurate as the result of the use of just three stop points 36, 37, 43 which are necessary and which suffice to ensure the parallelism of two planes.

Of course, the invention is not restricted to the case of parallelism of two planes, but extends to cover any arrangement in which three stops are able to fix precisely the relative position of Et mating plate 38 in a direction of a predetermined plane and while the spring 4 is being compressed.

With reference to FIGS. 7 to 10, the method for implementing the invention comprises a number of stages of introduction, mating, compression and mounting.

In FIG. 7, the plate 38 is moved up against the plate 35b by any means, not depicted, exerting a pulling force on the member 33 and causing the posts 31a, 31b to slide through the body 34. This raised position of the plate 38 allows the introduction of an upper spring retainer 10 placed on the upper end 12 of a spring 4 surrounding a shock absorber comprising a rod 3 with a threaded end 3a.

The introduction of all of these strut elements under the mounting head 30 is in advance of the next, mating, stage.

In FIG. 8, the mating of the plate 38 with the upper spring retainer 10 has been performed simply by allowing the guide assembly comprising the posts 31a, 31b, braced by the elements 32 and 33, to descend. During this descent, the upper spring retainer 10 positions itself via two pegs 10a, 10b in two cavities 43a, 43b of the plate 38. Alternatively, it is also possible to envisage, for example, other alternative forms of embodiment involving conical centering of an upper end 9 with respect to a plate such as 38. The mating of the upper spring retainer 10 and of the plate 38 thus ensures perfect relative positioning of the upper spring retainer 10 with respect to the plate 38 which is mounted in a floating manner via a universal joint on the moving assembly comprising the guide posts 31a, 31b. The presence of the guide posts 31a, 31b allowing translational movement T thus allows the plate to be positioned precisely on the spring retainer 10, regardless of the unconfined length of the spring 4. The device thus allows springs of different lengths to be mounted without altering the settings.

As a preference, the plate 38 rests on the upper spring retainer 10 under its own weight, without introducing parasitic loadings into the mounting as a result of the two freedoms of movement about the two axles 39 and 40.

In FIG. 9, once the plate 38 has been mated with the upper spring retainer 10, the movement of compressing the spring 4 is begun by moving the chuck supporting the shock absorber body relative to the body 34. The spring 4 then first of all pushes the entire head 30 in the direction of the arrow T, so as to shift the plate 38 parallel to itself. The position marking the start of compression of the spring 4 is then reached, in which position the plate 38, positioned on. the upper spring retainer 10, comes into contact with the stop 43 secured to the plate 35b, which limits the relative upward movement of the plate 38.

Compression is then continued, compressing the spring as far as the position of FIG. 10.

In FIG. 10, in a position reached during compression, the plates 35b and 38 are positioned exactly one with respect to the other by virtue of the positioning pegs 36, 37 collaborating with the passages 41, 42 of the plate 38.

Because of the positioning of the upper spring retainer 10 with respect to the plate 38 and of the positioning, during compression, of the plate 38 with respect, to the plate 35b, the spring 4 is preloaded in the desired predetermined position in accordance with the optimization conditions of document EP-0 780 250 A2.

At the end of compression, the shock absorber rod 3 is centered by its threaded end 3a passing through and protruding above the upper spring retainer 10. Mounting is then completed by screwing an end nut onto the threaded end 3a. The end nut 3a can be screwed on easily because of the openings made both in the plate 38 and in the plate 35b.

The invention is not restricted to the two embodiments described but on the contrary, covers any modification in form and any alternative form of embodiment that falls within the scope and spirit of the present invention.

For example, it would possible to supplement the device according to the present invention by combining it with measurement means such as those described in document EP-0 780 250 A2. To do that, all that is required is for the body 34 to be instrumented to take the measurements envisioned in document EP-0 780 250 A2 or for a plate 35b to be provided that is itself instrumented to detect the stresses transmitted by the strut before the end nut is screwed onto the threaded end 3a of the shock absorber rod 3.

What is claimed is:

1. A method of mounting a MacPherson suspension strut comprising a shock absorber having a body and a rod, and a coil spring to be compressively preloaded between a lower spring retainer secured to said shock absorber body and an upper end of said suspension strut including an upper spring retainer to be secured to an upper end of said shock absorber rod, said method comprising the steps of:

a) providing a mounting device having a shock absorber holding means and a mounting head which are movable one with respect to the other along a spring compression direction, said mounting head comprising a part having at least one degree of freedom in tilting about an axis transverse to said spring compression direction and at least a limit stop for stopping said part in a chosen predetermined orientation corresponding to a position in which said upper spring retainer is centered in a predetermined way with respect to said shock absorber rod;

b) introducing the suspension strut to be mounted into said mounting device by engaging the shock absorber body of said suspension strut in said shock absorber holding means, and placing the upper end of said suspension strut under said mounting head;

c) mating the upper end of said suspension strut with said part of the mounting head;

d) compressing the spring of said suspension strut by causing a relative movement between said shock absorber holding means and said mounting head along said spring compression direction, until said part of said mounting head comes into abutment with said limit stop and said shock absorber rod protrudes through a central hole of the upper spring retainer; and e) securing the upper end of said shock absorber rod lo said upper spring retainer.

2. A device for mounting a MacPherson suspension strut comprising a shock absorber having a body and a rod, and a coil spring to be compressively preloaded between a lower spring retainer secured to said shock absorber body and an upper end of said suspension strut including an upper spring retainer to be secured to ;m upper end of said shock absorber rod, said mounting device comprising:

a) a shock absorber holding means for holding the body of the shock absorber of the suspension strut to be mounted;

b) a mounting head for accommodating the upper end of said suspension strut, said shock absorber holding means and said mounting head being movable one with respect to the other along a spring compression direction;

wherein said mounting head comprises a body and a part having at least one degree of freedom with respect to the body of said mounting head, said part being able to tilt about an axis transverse to said spring compression direction, and said mounting head body having a limit stop for stopping said part in a chosen predetermined orientation corresponding to a position in which said upper spring retainer of said suspension strut, when mated with said part and when the spring of said suspension strut is compressed to such an extent that the shock absorber rod of said suspension strut protrudes through a central hole of said upper spring retainer, is centered in a predetermined way with respect to said shock absorber rod.

3. The device of claim 2, wherein said part of said mounting head has two degrees of freedom in tilting.

4. The device of claim 3, wherein said part of said mounting head is mounted on said body of said mounting head by a universal joint.

5. The device of claim 2, wherein said part of said mounting head is guided in sliding relative to said body of said mounting head.

6. The device of claim 2, wherein said part of said mounting head is shaped as a mating plate to accommodate the upper end of the suspension strut to be mounted, said mating plate having a central passage.

7. The device of claim 2, wherein the body of said mounting head has a member of predetermined orientation capable of limiting the tilting movement of said part of the mounting head while the spring of the suspension strut is being compressed.

8. The device of claim 7, wherein said member of said mounting head body is shaped as a stop plate having at least one limit stop that limits movement of said part of said mounting head relative to said stop plate.

9. The device of claim 8, wherein:

said part of said mounting head is shaped as a mating plate to accommodate the upper end of the suspension strut to be mounted;

said mounting head further comprises a support member for supporting said mating plate through a universal joint;

guide means are provided between said support member and the body of said mounting head for guiding said support member and said mating plate in sliding motion relative to the body of said mounting head in a direction parallel to said spring compression direction;

said body of said mounting head has a first limit stop that limits a sliding motion of said support member and said mating plate toward the stop plate of the body of said mounting head while the spring of the suspension strut is being compressed; and said stop plate has a pair of limit stops that limit tilting movement of said mating plate about said universal joint and define said chosen predetermined orientation in combination with said first limit stop in a compressed state of said spring.

* * * * *

UNITED STATES PATENT AND TRADEMARK OFFICE
CERTIFICATE OF CORRECTION

PATENT NO. : 6,470,554 B1
DATED : October 29, 2002
INVENTOR(S) : Francis Aubarede and Antoine Ducloux It is certified that error appears in the above-identified patent and that said Letters Patent is hereby corrected as shown below:

<u>Title page,</u>
Item [73], Assignee, "Generale" should read -- Générale -- and "Establissements" should read -- Etablissements --

<u>Column 1,</u>
Line 46, "elements;" should read -- elements --
Line 53, "absorber;" should read -- absorber; and --
Line 62, "joint;" should read -- joint; and --

<u>Column 2,</u>
Line 17, "compressed;" should read -- compressed; and --
Line 36, "strut;" should read -- strut; and --
Line 39, "struts;" should read -- struts. --
Line 63, "tyre" should read -- tire --

<u>Column 3,</u>
Line 59, "the-external" should read -- the external --

<u>Column 4,</u>
Line 28, "is-centered" should read -- is centered --

<u>Column 5,</u>
Line 17, "Et" should read -- a --

<u>Column 6,</u>
Line 7, "respect," should read -- respect --
Line 64, "lo" should read -- to --

UNITED STATES PATENT AND TRADEMARK OFFICE
CERTIFICATE OF CORRECTION

PATENT NO. : 6,470,554 B1
DATED : October 29, 2002
INVENTOR(S) : Francis Aubarede and Antoine Ducloux It is certified that error appears in the above-identified patent and that said Letters Patent is hereby corrected as shown below:

Column 7,
Line 4, ";m" should read -- an --
Line 13, "tion;" should read -- tion, --

Signed and Sealed this

Ninth Day of September, 2003

JAMES E. ROGAN
*Director of the United States Patent and Trademark Office*